US011961980B2

(12) United States Patent
Arakawa et al.

(10) Patent No.: US 11,961,980 B2
(45) Date of Patent: Apr. 16, 2024

(54) LITHIUM ION BATTERY SCRAP TREATMENT METHOD

(71) Applicant: JX METALS CORPORATION, Tokyo (JP)

(72) Inventors: Junichi Arakawa, Tsuruga (JP); Yasufumi Haga, Tsuruga (JP); Junichi Ito, Tokyo (JP)

(73) Assignee: JX METALS CORPORATION, Tokyo (JP)

( * ) Notice: Subject to any disclaimer, the term of this patent is extended or adjusted under 35 U.S.C. 154(b) by 1169 days.

(21) Appl. No.: 16/499,122

(22) PCT Filed: Mar. 29, 2018

(86) PCT No.: PCT/JP2018/013463
§ 371 (c)(1),
(2) Date: Sep. 27, 2019

(87) PCT Pub. No.: WO2018/181816
PCT Pub. Date: Oct. 4, 2018

(65) Prior Publication Data
US 2020/0044295 A1 Feb. 6, 2020

(30) Foreign Application Priority Data
Mar. 31, 2017 (JP) .................. 2017-070419

(51) Int. Cl.
H01M 10/54 (2006.01)
B09B 3/00 (2022.01)
(Continued)

(52) U.S. Cl.
CPC .............. H01M 10/54 (2013.01); B09B 3/00 (2013.01); B09B 5/00 (2013.01); C01G 45/02 (2013.01);
(Continued)

(58) Field of Classification Search
CPC .................................................... H01M 10/54
See application file for complete search history.

(56) References Cited

U.S. PATENT DOCUMENTS 8,298,502 B2  10/2012  Yamaoka et al.
2011/0135547 A1  6/2011  Kobayashi et al.
2013/0269484 A1*  10/2013  Ishida .............. C22B 7/007
                                                      75/743

FOREIGN PATENT DOCUMENTS

CN  105098279 A    11/2015
CN  105098279   *  11/2016
(Continued)

OTHER PUBLICATIONS

International Preliminary Report on Patentability and Written Opinion of the International Searching Authority(Forms PCT/IB/326, PCT/IB/373, PCT/IB/338 and PCT/ISA/237), dated Oct. 10, 2019, for International Application No. PCT/JP2018/013463.
(Continued)

Primary Examiner — Ula C Ruddock
Assistant Examiner — Mary Grace Byram
(74) Attorney, Agent, or Firm — Birch, Stewart, Kolasch & Birch, LLP

(57) ABSTRACT

The present invention relates to a method for treating lithium ion battery scrap containing Li, Ni, Co, Mn, Al, Cu and Fe, the method comprising carrying out a calcination step, a crushing step and a sieving step in this order, and after the steps, the method comprising: a leaching step of leaching the lithium ion battery scrap by adding it to an acidic solution to leave at least a part of Cu as a solid; a Fe/Al removal step comprising allowing a leached solution obtained in the leaching step to pass through a Fe removal process for separating and removing Fe by addition of an oxidizing agent and an Al removal process for separating and removing a part of Al by neutralization in any order; an Al/Mn
(Continued)

extraction step of extracting and removing a residue of Al and Mn from a separated solution obtained in the Fe/Al removal step by solvent extraction; a Co recovery step of extracting and back-extracting Co from a first extracted solution obtained in the Al/Mn extraction step by solvent extraction and recovering the Co by electrolytic winning; a Ni recovery step of extracting and back-extracting, by solvent extraction, a part of Ni from a second extracted solution obtained by the solvent extraction in the Co recovery step and recovering the Ni by electrolytic winning; a Li concentration step of extracting and back-extracting, by solvent extraction, a residue of Ni and Li from a third extracted solution obtained by the solvent extraction in the Ni recovery step and repeating the operations of the extracting and the back-extracting to concentrate Li; and a Li recovery step of carbonating Li in a Li concentrated solution obtained in the Li concentration step to recover the Li as lithium carbonate.

20 Claims, 1 Drawing Sheet

(51) Int. Cl.
| | |
|---|---|
| *B09B 5/00* | (2006.01) |
| *C01G 45/02* | (2006.01) |
| *C01G 49/02* | (2006.01) |
| *C22B 1/02* | (2006.01) |
| *C22B 3/00* | (2006.01) |
| *C22B 3/06* | (2006.01) |
| *C22B 3/44* | (2006.01) |
| *C22B 7/00* | (2006.01) |
| *C22B 15/00* | (2006.01) |
| *C22B 21/00* | (2006.01) |
| *C22B 23/00* | (2006.01) |
| *C22B 26/12* | (2006.01) |
| *H01M 10/0525* | (2010.01) |

(52) U.S. Cl.
CPC ............... *C01G 49/02* (2013.01); *C22B 1/02* (2013.01); *C22B 3/06* (2013.01); *C22B 3/44* (2013.01); *C22B 7/00* (2013.01); *C22B 7/007* (2013.01); *C22B 15/00* (2013.01); *C22B 15/0086* (2013.01); *C22B 21/00* (2013.01); *C22B 23/00* (2013.01); *C22B 23/0415* (2013.01); *C22B 26/12* (2013.01); *H01M 10/0525* (2013.01); *Y02P 10/20* (2015.11); *Y02W 30/84* (2015.05)

(56) References Cited

FOREIGN PATENT DOCUMENTS

| | | | |
|---|---|---|---|
| EP | 2450991 A1 | | 5/2012 |
| JP | 2010-180439 A | | 8/2010 |
| JP | 2013-76112 A | | 4/2013 |
| JP | 2013076112 | * | 4/2013 |
| JP | 2014-162982 A | | 9/2014 |
| JP | 5706457 | * | 4/2015 |
| JP | 5706457 B2 | | 4/2015 |
| JP | 2016-37661 A | | 3/2016 |
| JP | 2016037661 | * | 3/2016 |
| JP | 2018-191093 A | | 11/2016 |

OTHER PUBLICATIONS

"A Handbook of Catalysts", edited by Zhu Hongfa, Golden Shield Publishing House, p. 8, first edition in Aug. 2008, with English translation.
"Ceramic Pigment Application and Preparation Technology", edited by Wang Jian, Jiangxi University Press, p. 48, first edition, Jan. 2017, with English translation.
Official Action issued in corresponding Chinese Application No. 201880022587.2 dated May 21, 2021, with machine translation.
International Search Report (PCT/ISA/210) issued in PCT/JP2018/013463, dated Jun. 5, 2018.
Extended European Search Report, dated Nov. 6, 2020. for corresponding European Application No. 18775761.2.
Canadian Office Action for corresponding Canadian Application No. 3,058,572, dated Aug. 27, 2021.

* cited by examiner

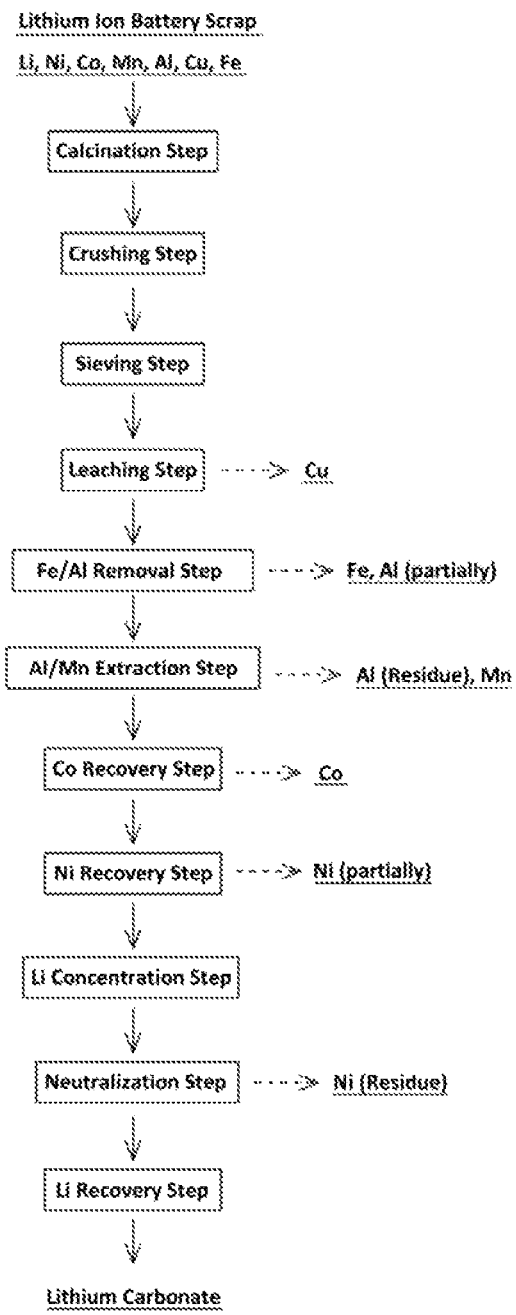

LITHIUM ION BATTERY SCRAP TREATMENT METHOD

TECHNICAL FIELD

The present invention relates to a method for treatment lithium ion battery scrap. More particularly, the present invention proposes a technique that can be effectively used for recovering valuable metals from lithium ion battery scrap.

BACKGROUND ART

Lithium ion batteries used in various industrial fields including various electronic devices employ lithium metal salts containing manganese, nickel and cobalt as positive electrode active materials. Recently, with an increased amount of lithium ion batteries to be used and expansion of the range of use, an amount of the lithium ion batteries to be discarded has been increased due to expired product life of the batteries and defects in the manufacturing processes.

Under such circumstances, there is a need for easily recovering expensive elements such as nickel and cobalt as stated above from a large amount of lithium ion battery scrap discarded, with a relatively low cost in order to reuse the elements.

In order to process the lithium ion battery scrap for recovering the valuable metals, the lithium ion battery scrap in the form of powder or particle obtained through each step such as calcination, crushing and sieving as required are firstly acid-leached using hydrogen peroxide water, and lithium, nickel, cobalt, manganese, iron, copper, aluminum or the like that can be contained therein are dissolved in an acidic solution to obtain a leached solution.

The leached solution is then subjected to a solvent extraction method to sequentially separate respective metal elements. In this case, the leached solution is sequentially subjected to a plurality of stages of solvent extraction or neutralization depending on the metals to be separated and each solution obtained in each stage is subjected to back extracting, electrolysis, carbonization or other treatments, in order to separate each metal leached in the leached solution. More particularly, the respective valuable metals can be recovered by firstly recovering iron and aluminum, subsequently recovering manganese and copper, then cobalt, and then nickel, and finally leaving lithium in the aqueous phase.

For such prior arts, Patent Document 1 discloses a method for recovering nickel from an aqueous sulfuric acid solution containing nickel and cobalt, and impurity elements such as iron, aluminum and manganese, the method comprising: removing iron and aluminum from the aqueous sulfuric acid solution by an oxidation neutralization treatment, then separating and recovering a mixed hydroxide containing nickel and cobalt by a neutralization treatment, and then obtaining back extraction solutions each containing cobalt and nickel by a solvent extraction treatment from a concentrate obtained by dissolving the mixed hydroxide.

Further, Patent Document 2 discloses that an aqueous metal mixed solution containing a metal group A consisting of lithium, manganese, nickel and cobalt; and a metal group B consisting of copper, aluminum and iron are sequentially subjected to solvent extraction processes under certain conditions to recover each metal.

CITATION LIST

Patent Literatures

Patent Document 1: Japanese Patent Application Publication No. 2010-180439 A
Patent Document 2: Japanese Patent No. 5706457 B

SUMMARY OF INVENTION

Technical Problem

For each step of recovering metals from the lithium ion battery scrap as described above, a number of techniques related to individual methods, partial step order and the like have been conventionally proposed. However, it is difficult to say that a series of processes, in particular from the leaching step to the recovery step, which can recover various metals at a sufficiently high recovery rate with a low cost, has been established.

The present invention has been made to solve such problems. An object of the present invention is to provide a method for treating lithium ion battery scrap, which can be effectively used in a series of processes including, in particular a leaching step to a recovery step of each metal, which will be carried out for recovering valuable metals from lithium ion battery scrap.

Solution to Problem

The present invention relates to a method for treating lithium ion battery scrap containing Li, Ni, Co, Mn, Al, Cu and Fe, the method comprising carrying out a calcination step, a crushing step and a sieving step in this order, and after the steps, the method comprising: a leaching step of leaching the lithium ion battery scrap by adding it to an acidic solution to leave at least a part of Cu as a solid; a Fe/Al removal step comprising allowing a leached solution obtained in the leaching step to pass through a Fe removal process for separating and removing Fe by addition of an oxidizing agent and an Al removal process for separating and removing a part of Al by neutralization in any order; an Al/Mn extraction step of extracting and removing a residue of Al and Mn from a separated solution obtained in the Fe/Al removal step by solvent extraction; a Co recovery step of extracting and back-extracting Co from a first extracted solution obtained in the Al/Mn extraction step by solvent extraction and recovering the Co by electrolytic winning; a Ni recovery step of extracting and back-extracting, by solvent extraction, a part of Ni from a second extracted solution obtained by the solvent extraction in the Co recovery step and recovering the Ni by electrolytic winning; a Li concentration step of extracting and back-extracting, by solvent extraction, a residue of Ni and Li from a third extracted solution obtained by the solvent extraction in the Ni recovery step and repeating the operations of the extracting and the back-extracting to concentrate Li; and a Li recovery step of carbonating Li in a Li concentrated solution obtained in the Li concentration step to recover the Li as lithium carbonate.

In this case, it is preferable that in the solvent extraction in the Ni recovery step, a carboxylic acid-based extracting agent is used for the second extracted solution.

In this case, it is preferable to further comprise a neutralization step of neutralizing the Li concentrated solution obtained in the Li concentration step and recovering a residue of the Ni, prior to the Li recovery step. Preferably, in the neutralization step, a pH of the Li concentrated solution is within a range of from 10 to 13.

Also, the present invention relates to a method for treating lithium ion battery scrap that contains Li, Co, Al, Cu and Fe and does not contain Ni, the method comprising carrying out a calcination step, a crushing step and a sieving step in this order, and after the steps, the method comprising: a leaching step of leaching the lithium ion battery scrap by adding it to an acidic solution to leave at least a part of Cu as a solid; a Fe/Al removal step comprising allowing a leached solution obtained in the leaching step to pass through a Fe removal process for separating and removing Fe by addition of an oxidizing agent and an Al removal process for separating and removing a part of Al by neutralization in any order; an Al/Mn extraction step of extracting a residue of Al and Mn from a separated solution obtained in the Fe/Al removal step by solvent extraction; a Co recovery step of extracting and back-extracting Co from a first extracted solution obtained in the Al/Mn extraction step by solvent extraction and recovering the Co by electrolytic winning; a Li concentration step of extracting and back-extracting, by solvent extraction, Li from a second extracted solution obtained by the solvent extraction in the Co recovery step and repeating the operations of the extracting and the back-extracting to concentrate Li; and a Li recovery step of carbonating Li in a Li concentrated solution obtained in the Li concentration step to recover the Li as lithium carbonate.

The oxidizing agent used in the Fe removal process in the Fe/Al step may contain Mn.

It is preferable that in the leaching step, the acidic solution has a pH of from 0 to 2 and an oxidation-reduction potential (ORPvsAg/AgCl) of from −500 mV to 0 mV.

It is preferable that the Fe removal process in the Fe/Al step comprises adjusting a pH within a range of from 3.0 to 4.0, and the Al removal process comprising adjusting a pH within a range of from 4.0 to 6.0.

It is preferable that in the Al/Mn extraction step, an extracting agent comprising a phosphate ester-based extracting agent and an oxime-based extracting agent is used for the separated solution.

It is preferable that in the solvent extraction in the Co recovery step, a phosphonate ester-based extracting agent is used for the first extracted solution.

It is preferable that in the solvent extraction in the Li concentration step, an extracting agent comprising 2-ethylhexyl 2-ethylhexylphosphonate or di-2-ethylhexylphosphoric acid is used.

It is preferable that in the Li recovery step, the carbonating of Li is carried out by adding a carbonate salt to or blowing a carbon dioxide gas into the Li concentrated solution. Also, it is preferable that in the Li recovery step, the lithium carbonate is subjected to repulp washing and the carbon dioxide gas is blown, and impurities are then removed by solid-liquid separation to purity the lithium carbonate.

Advantageous Effects of Invention

According to the method for treating lithium ion battery scrap of the present invention, valuable metals can be effectively recovered from the lithium ion battery scrap by carrying out the defined steps as described.

BRIEF DESCRIPTION OF DRAWINGS

FIG. 1 is a flowchart showing a method for treating lithium ion battery scrap according to one embodiment of the present invention.

DESCRIPTION OF THE PREFERRED EMBODIMENTS

Hereinafter, embodiments of the present invention will be described in detail below.

In the method for treating lithium ion battery scrap according to an embodiment of the present invention, as illustrated in FIG. 1, the lithium ion battery scrap is subjected to a calcination step, a crushing step, a sieving step, a leaching step, a Fe/Al removal step, an Al/Mn extraction step, a Co recovery step, a Ni recovery process, a Li concentration step, a neutralization step and a Li recovery step in this order. However, although details will be described later, the Ni recovery step and the neutralization step may be omitted.

Especially herein, a series of processes from the leaching step to the Li recovery step is important, where a predetermined metal is separated or recovered in each step. This can allow higher recovery rates of metals to be recovered and reduction of processing cost to be achieved.

(Lithium Ion Battery Scrap)

Lithium ion battery scrap targeted by this invention is lithium ion batteries that can be used in mobile phones and other various electronic devices and have been discarded due to expired battery product life, production defects or other reasons. It is preferable to recover metals from such lithium ion battery scrap in terms of effective utilization of resources.

Here, the present invention is directed to lithium ion battery scrap containing at least Li, Co, Al, Cu, and Fe. Further, the lithium ion battery scrap may contain at least one of Ni and Mn. In an embodiment of the present invention, the lithium ion battery scrap generally contains from 1.0% to 2.5% by mass of Li; from 0.1% to 15.0% by mass of Ni; from 0.1% to 15.0% by mass of Co; from 0.1% to 15.0% by mass of Mn: from 5.0% to 20.0% by mass of Al; from 5.0% to 20.0% by mass of Cu; from 1.0% to 10.0% by mass of Fe.

Li, Ni, Co, and Mn in the lithium ion battery scrap are often contained as positive electrode active materials made of a single metal oxide of one or more of those elements or a composite metal oxide of two or more of those metals.

Al in the lithium ion battery scrap is usually contained as a housing that is an outer casing enclosing the periphery of the lithium ion battery scrap, or as an aluminum foil (positive electrode substrate) to which a positive electrode active material is applied and fixed by polyvinylidene fluoride (PVDF) or other organic binders, for example. Among these, examples of the housing include those made of only Al, and those containing Al and Fe, or aluminum laminate, or the like.

Further, Cu and Fe in the lithium ion battery scrap may be contained in negative electrode materials and the like.

Furthermore, the lithium ion battery scrap generally contains an electrolytic solution in the housing. For example, ethylene carbonate, diethyl carbonate, or the like may be used as the electrolytic solution.

(Calcination Step)

In the calcination step, the lithium ion battery scrap is heated. The calcination step is generally carried out for the purposes of increasing a temperature of the lithium ion battery scrap, removing the internal electrolytic solutions to render them harmless, and also decomposing the binder that binds the aluminum foils to the positive electrode active materials to facilitate separation of the aluminum foils from the positive electrode active materials during crushing and sieving and increase a recovery rate of the positive electrode active materials recovered under the sieve, and further changing a metal such as Co contained in the lithium ion battery scrap to a form of the metal which can be easily dissolved in the leaching with an acid, and the like.

In the calcination step, the lithium ion battery scrap can be heated in a temperature range of from 450° C. to 650° C. for 20 minutes to 120 minutes such that aluminum having a melting point of 660° C. is not melted. By this way, a lithium metal salt in the positive electrode material ($LiCoO_2$ for Co-based material) is decomposed, and a large amount of cobalt can be in the form of cobalt oxide (CoO) or simple substance cobalt which will be easily leached with an acid. Also, nickel may be changed from $LiNiO_2$ to simple substance nickel, and manganese may be changed from $LiMnO_2$ and $LiMn_2O_4$ to simple substance manganese.

The calcination step can be carried out by using various heating equipment such as a rotary kiln furnace or other various furnaces, and a furnace for heating in an air atmosphere.

(Crushing Step)

After heating the lithium ion battery scrap in the calcination step, a crushing step of removing positive electrode materials and negative electrode materials from the housing is carried out.

The crushing step is carried out to selectively separate the positive electrode active materials from the aluminum foils to which the positive electrode active materials are applied, while destroying the housing of the lithium ion battery scrap.

Various known apparatuses or devices can be used herein. In particular, it is preferable to use an impact-type crusher that can crush lithium ion battery scrap by applying an impact while cutting. Examples of the impact-type crusher include a sample mill, a hammer mill, a pin mill, a wing mill, a tornado mill, and a hammer crusher. It should be noted that a screen can be installed at an exit of the crusher, whereby the lithium ion battery scrap is discharged from the crusher through the screen when crushed to a size that can pass through the screen.

(Sieving Step)

After crushing the lithium ion battery scrap in the crushing step, the lithium ion battery scrap is sieved using a sieve having an appropriate opening, for example, for the purpose of removing Al powder. Thus, Al or Cu remains on the sieve, and powdered or particulate lithium ion battery scrap from which Al or Cu has been removed to some extent can be obtained below the sieve.

(Leaching Step)

In the leaching step, the powdered or particulate lithium ion battery scrap obtained as described above is added to an acidic solution such as sulfuric acid and leached therein.

Here, since the Co component in the battery powder is effectively changed to cobalt oxide (CoO) and simple substance cobalt by the above calcination step, the Co component can be easily dissolved in the acidic solution.

On the other hand, while metals such as Co, Ni, Mn, Fe, and Al remain as solids in the acidic solution, especially while all of these metals are completely dissolved, an increase in a leaching rate of Cu will be suppressed. It is believed that this would be because Co, Ni, Mn, Fe, Al, and the like are base metals having a lower standard oxidation-reduction potential than that of Cu, so that dissolution reaction of Co or the like proceeds prior to Cu contained in lithium ion battery scrap, and Cu that have already been dissolved in the acidic solution is precipitated. That is, while the single substance metal remains as a solid in the acidic leaching solution, the oxidation-reduction potential (silver/silver chloride potential reference) is maintained at a lower level to suppress an increase in the leaching rate of Cu.

In particular, it is preferable to adjust the components in the lithium ion battery scrap or other conditions such that the oxidation-reduction potential (ORP value, silver/silver chloride potential reference) of the acidic leaching solution during leaching is 0 mV or less. This is because the leaching rate of Cu begins to increase as the oxidation-reduction potential exceeds 0 mV. In terms of effectively suppressing the leaching rate of Cu, the oxidation-reduction potential is more preferably −100 mV or less.

In the leaching step, a pH of the acidic solution is gradually increased such that Co, Ni, and the like are dissolved but Cu is not dissolved. More specifically, the pH of the acidic solution during leaching can be from 0 to 2.0. If the pH at this time is too high, the leaching rate of Co and Ni may not be sufficient. On the other hand, if the pH is too low, the leaching of metallic Co, Ni, Al, and the like proceeds rapidly, resulting in leaching out of Cu, and cost may increase due to pH adjustment when pH needs to be increased in a subsequent step.

In the leaching step, a leaching time from addition of the lithium ion battery scrap to the acidic solution to the end of leaching is preferably from 0.5 to 10 hours. If the reaction time is too short, Co or Ni to be dissolved may not be sufficiently dissolved. On the other hand, if the leaching time is too long, the dissolution of Co or the like may be completed and the dissolution of Cu may begin. A more preferable range of the leaching time is from 1 hour to 5 hours, more preferably from 1 hour to 3 hours.

By leaching as described above, the leaching rate of Cu in the leached solution at the end of leaching is preferably 1% or less. In particularly, it is preferable that no Cu is leached in the leached solution, and the leaching rate of Cu is 0%.

(Fe/Al Removal Step)

The leached solution obtained in the leaching step is subjected to a Fe/Al removal step including a Fe removal process and a Al removal process, thereby providing a separated solution in which Fe and a part of Al have been separated and removed. In the Fe/Al removal step, the Fe removal process can be carried out before the Al removal process, or the Al removal process can be carried out before the Fe removal process. That is, the Fe removal process and the Al removal process may be carried out in any order.

In the Fe removal process, an oxidizing agent is added to the leached solution to precipitate Fe in the leached solution, and the Fe is removed by subsequent solid-liquid separation.

In the Fe removal process, Fe is oxidized from a divalent one to a trivalent one by the addition of the oxidizing agent, and the trivalent Fe is precipitated as an oxide (hydroxide) at a lower pH than that of the divalent Fe. Therefore, the adjustment to a lower pH can lead to precipitation of Fe. Fe is often precipitated as a solid such as iron hydroxide ($Fe(OH)_3$). A greatly increase in the pH will lead to precipitation of Co. However, in the Fe removal process, Fe can be precipitated without significantly increasing the pH, so that the precipitation of Co at this time can be effectively suppressed.

In Fe removal process, if the pH is too low, Fe cannot be sufficiently precipitated. On the other hand, if the pH is too high, other metals such as Co are also precipitated. From the point of view, the pH during the Fe removal process is preferably from 3.0 to 4.0, more preferably from 3.0 to 3.5.

An oxidation-reduction potential (ORPvsAg/AgCl) or an ORP value in the Fe removal process is preferably from 500 mV to 1400 mV, and more preferably from 700 mV to 1200 mV, when the Fe removal process is carried out before the Al removal process. On the other hand, when the Fe removal process is carried out after the Al removal process, it is preferably from 300 mV to 900 mV, and more preferably from 500 mV to 700 mV. If the ORP value at this time is too high, Co may be oxidized and precipitated as an oxide. On the other hand, if the ORP value is too low, Fe may not be oxidized.

The oxidizing agent to be added in the Fe removal process is not particularly limited as long as it can oxidize Fe, and is preferably manganese dioxide, a positive electrode active material, and/or a manganese-containing leached residue obtained by leaching the positive electrode active material. These can effectively oxidize Fe. The manganese-containing leached residue obtained by leaching the positive electrode active material with an acid or the like may contain manganese dioxide. When the positive electrode active material described above is used as the oxidizing agent, it causes precipitation reaction in which Mn dissolved in the leached solution will be converted to manganese dioxide, so that the precipitated Mn may be removed together with Fe. The oxidizing agent preferably contains Mn.

Further, in the Fe removal process, an alkali such as sodium hydroxide, sodium carbonate, and ammonia can be added to adjust the pH to the range as defined above.

In the Al removal process, the pH is neutralized such that it is increased within the range of from 4.0 to 6.0, to precipitate Al, and the Al is then removed by solid-liquid separation. In the Al removal process, if the pH is too low, Al cannot be sufficiently precipitated. On the other hand, if the pH is too high, other metals such as Co are also precipitated. From the viewpoint, the pH in the Al removal process is more preferably from 4.0 to 6.0, and even more preferably from 4.5 to 5.0.

In the Al removal process, for example, an alkali such as sodium hydroxide, sodium carbonate, and ammonia can be added to increase the pH within the range as defined above.

In the Al removal process, the ORP value (ORPvsAg/AgCl) is preferably from −500 mV to 100 mV, and more preferably from −400 mV to 0 mV. If the ORP value at this time is too high, Co may be precipitated as tricobalt tetroxide ($Co_3O_4$). On the other hand, if the ORP value is too low, it is concerned that Co is reduced into a single substance metal (Co metal) and precipitated.

In the Al removal process, the solution temperature is preferably from 50° C. to 90° C., and more preferably from 60° C. to 90° C. That is, if the solution temperature is less than 50° C., there is a concern that the reactivity may be deteriorated, and if it is higher than 90° C., an apparatus capable of withstanding high temperature is required, as well as it is not preferable in terms of safety.

Here, when the Al removal process and the Fe removal process are carried out in this order, Cu remaining as a solid without being dissolved in the leaching step and carbon that can be contained in the lithium ion battery scrap may also be separable by solid-liquid separation in the Al removal process. Therefore, in this case, for example, the solid-liquid separation for removing Cu alone immediately after the leaching step can be omitted to achieve improvement of a processing efficiency and reduction of cost.

A molar ratio of Li to Al (Li/Al ratio) in the leached solution obtained in the above leaching step is preferably 1.1 or more in terms of improving filterability of the precipitate in the Al removal process. In this case, Al contained in the precipitate in the Al removal process generates gel-like $Al(OH)_3$, as well as composite oxides and composite hydroxides such as crystalline $LiAlO_2$ and $LiAl_2(OH)_7$, which have forms close to powder. The precipitate is easily filtered during solid-liquid separation, so that the time required for filtration during the solid-liquid separation in the Al removal process can be shortened.

In the Al removal process, a part of Al contained in the leached solution is typically removed. Here, if all Al is to be removed, Co and Ni are also removed by coprecipitation, resulting in loss. Therefore, a condition for removing all Al is not intended. Thus, the residue of the Al will remain in a dissolved state in the separated solution. The residue of Al can be removed in the next Al/Mn extraction step. An Al concentration of the separated solution is generally from 0.1 g/L to 1.0 g/L, typically from 0.3 g/L to 0.8 g/L.

(Al/Mn Extraction Step)

After the Fe/Al removal step, solvent extraction is carried out to extract the residue of Al and Mn from the separated solution obtained by that step. Here, the residue of Al and Mn are extracted to obtain a first extracted solution as an extraction residual liquid (an aqueous phase) from which those metals have been removed. Even if the lithium ion battery scrap does not contain Mn, the oxidizing agent added during the Fe removal process in the above Fe/Al removal step often contains Mn. Accordingly, the separated solution may contain Mn.

More specifically, it is preferable to use a mixed extracting agent containing a phosphate ester-based extracting agent and an oxime-based extracting agent for the separated solution.

Here, examples of the phosphate ester-based extracting agent include di-2-ethylhexylphosphoric acid (trade name: D2EHPA or DP8R). The oxime-based extracting agent is preferably aldoxime or based on aldoxime. Specific examples include 2-hydroxy-5-nonylacetophenone oxime (trade name: LIX84), 5-dodecyl salicylaldoxime (trade name: LIX860), a mixture of LIX84 and LIX860 (trade name: LIX984), 5-nonyl salicylaldoxime (trade name: ACORGAM5640) and the like, among which 5-nonyl salicylaldoxime is preferable in terms of price and the like.

In the solvent extraction in the Al/Mn extraction step, the pH is preferably from 2.5 to 4.0, and more preferably from 2.8 to 3.3.

(Co Recovery Step)

The first extracted solution obtained in the Al/Mn extraction step mainly contains Li and Co, and optionally Ni. The first extracted solution is subjected to solvent extraction using preferably a phosphonate ester-based extracting agent, and Co is extracted from the extraction residual liquid (a second extracted solution) into a solvent.

As the phosphonate ester-based extracting agent, 2-ethylhexyl 2-ethylhexylphosphonate (trade name: PC-88A, lonquest 801) is preferable in terms of separation efficiency of nickel and cobalt.

In the solvent extraction in the Co recovery step, the pH is preferably from 4.5 to 5.5, and more preferably from 4.8 to 5.2.

The extracting agent (an organic phase) containing Co after the solvent extraction can be subjected to back extraction. Co moved towards the aqueous phase side by back extraction is recovered by electrolytic winning.

(Ni Recovery Step)

If the lithium ion battery scrap contains Ni, after the Co recovery step the second extracted solution obtained by the solvent extraction is subjected to solvent extraction preferably using a carboxylic acid-based extracting to separate Ni from the extraction residual liquid (a third extracted solution). Examples of the carboxylic acid-based extracting agent include neodecanoic acid, naphthenic acid, and the like. Among them, neodecanoic acid is preferred for the reason of the ability to extract Ni. The extracting agent (an organic phase) containing Ni after the solvent extraction can be subjected to back extraction. Ni moved towards the aqueous phase side is recovered by electrolytic winning.

However, in the solvent extraction in the Ni recovery step, if Ni is to be completely extracted, then it is necessary to increase the pH to a higher value such as 7.5 or more. Therefore, in the Ni recovery step, only a part of Ni should be extracted without extracting Ni completely, so that the third extracted solution will contain Ni remaining without being extracted, in an amount of, for example from 0.001 g/L to 0.2 g/L, and typically 0.01 g/L to 0.05 g/L.

In the solvent extraction in the Ni recovery step, the pH is preferably from 6.0 to 8.0, and more preferably from 6.8 to 7.2.

When the lithium ion battery scrap does not contain Ni, the Ni recovery step can be omitted, although not shown.

(Li Concentration Step)

When the lithium ion battery scrap contains Ni and the above Ni recovery step is carried out, a residue of Ni and Li are extracted and back-extracted from the third extracted solution obtained by the solvent extraction in the Ni recovery step, and the operations of the extraction and the back extraction are repeated to concentrate Li. On the other hand, when the lithium ion battery scrap does not contain Ni and the Ni recovery step is omitted, after the Co recovery step, Li is extracted and back-extracted from the second extracted solution obtained by the solvent extraction, and the operations of the extraction and back extraction can be repeated to concentrate Li. Thus, a Li concentrated solution is obtained.

An extracting agent used in the Li concentration preferably contains 2-ethylhexyl 2-ethylhexylphosphonate or di-2-ethylhexylphosphoric acid.

Here, the organic phase from which Li has been extracted is back-extracted, and the repeating of the extraction and the back extraction can increase a Li concentration in the back-extracted solution to concentrate Li.

Preferably, the extraction and the back extraction are repeated until the Li concentration in the Li concentrated solution is 5.0 g/L or more, particularly 10.0 g/L or more. By increasing the Li concentrated solution to such a level, high quality lithium carbonate can be obtained after a Li recovery step as described later.

(Neutralization Step)

When the lithium ion battery scrap contains Ni and the Ni recovery step is carried out, Ni remaining in the third extracted solution is extracted and back-extracted with Li in the Li concentration step described above, so that Ni will be contained in the Li concentrated solution. In this case, a neutralization step can be carried out prior to the Li recovery step in order to separate Ni from the Li concentrated solution. Ni contained in the third extracted solution is concentrated together with lithium ions in the solvent extraction step. Therefore, the Ni concentration in the Li concentrated solution is, for example, from 200 mg/L to 5000 mg/L, and typically from 500 mg/L to 3000 mg/L.

In the neutralization step, the Li concentrated solution is neutralized by adding an alkali to the acidic Li concentrated solution to recover Ni as a solid. Examples of the alkali at this time include sodium hydroxide, calcium hydroxide, and the like. A pH of the Li concentrated solution obtained in the above Li concentration step is, for example, from 0.5 to 1.5. In the neutralization step, the pH is preferably adjusted to 10 to 13 by adding the alkali to the Li concentrated solution. In the neutralization step, the solution temperature can be an ordinary temperature, and stirring can be carried out at a predetermined speed and time after the addition of the alkali. Thus, the Ni concentration in the Li concentrated solution can be reduced to about 10 mg/L or less.

However, when the lithium ion battery scrap does not contain Ni, the Ni recovery step as well as the neutralization step can be omitted.

(Li Recovery Step)

After the Li concentration step or the neutralization step, the Li concentrated solution is subjected to a Li recovery step to recover lithium contained in that solution. Here, Li in the Li concentrated solution are recovered as lithium carbonate by adding a carbonate salt to or blowing a carbon dioxide gas into the Li concentrated solution.

After the addition of the carbonate salt or the blowing of the carbon dioxide gas, the solution is maintained, for example at a solution temperature in a range of from 20° C. to 50° C. for a certain period of time, with optionally stirring.

Examples of the carbonate salt added to the Li concentrated solution include sodium carbonate, ammonium carbonate and the like, preferably sodium carbonate in the terms of a recovery rate. An amount of the carbonate salt added can be, for example, from 1.0 to 1.7 times, preferably from 1.2 to 1.5 times the Li molar amount. The amount of the carbon dioxide gas added can be, for example, from 1.0 to 1.7 times, preferably from 1.2 to 1.5 times the Li molar amount.

When the carbonate salt is added, the carbonate salt in the form of solid is preferably added to the Li concentrated solution, without dissolving the carbonate in water or the like. This is because when the carbonate salt is dissolved and added as a solution, an amount of the solution will be increased by the added amount, so that an amount of lithium carbonate dissolved is increased, which causes loss of Li.

A pH of the Li concentrated solution during carbonation is preferably relatively high such as 10 to 13. If the carbonate salt is added in a state where the pH is lower, it will be lost as a carbon dioxide gas, so there is a concern that a reaction efficiency may be reduced.

For example, by adding the alkali in the neutralization step as described above, the pH of the neutralized solution could be adjusted to the above range.

Li quality of lithium carbonate thus obtained is preferably 17% or more, more preferably 18% or more.

When the Li quality of lithium carbonate is lower than a predetermined value, lithium carbonate can be purified to obtain higher quality lithium carbonate.

Specifically, the purification of lithium carbonate is carried out by subjecting crude lithium carbonate obtained such as by adding the carbonate salt to the Li concentrated solution to repulp washing, and blowing a carbon dioxide gas into the solution to dissolve carbonic acid in the solution, and then separating the lithium hydrogen carbonate solution from Ca, Mg and the like by solid-liquid separation. Subsequently, deoxidization and concentration are carried out, and purified lithium carbonate is then separated from a filtrate by solid-liquid separation. When the quality of soluble impurities such as Na in the purified lithium carbonate is high, further washing can be carried out.

Examples

The method for treating lithium ion battery scrap according to the present invention was experimentally conducted and its effects were confirmed as described below. However, the description herein is merely for the purpose of illustration and is not intended to be limited thereto.

As an Example, lithium ion battery scrap containing 3.5% by mass of Li; 1.7% by mass of Ni; 27.1% by mass of Co; 1.1% by mass of Mn; 5.4% by mass of Al; 3.8% by mass of Cu; and 0.3% by mass of Fe was subjected to a test carrying out the calcination step, crushing step, sieving step, leaching step, Fe/Al removal step, Al/Mn extraction step, Co recovery step, Ni recovery step, Li concentration step, neutralization step and Li recovery process in this order.

Here, in the Li concentration step, the solvent extraction was carried out using 2-ethylhexyl 2-ethylhexylphosphonate as an extracting agent. The pH during the solvent extraction was 6.0. The resulting solvent was then mixed with a back extracting agent containing sulfuric acid having an acid concentration of 1.5 g/L and a pH of 1.5 and stirred to carry out back extraction. These extractions and back extractions were repeated to obtain a Li concentrated solution. The Li concentration in the Li concentrated solution was 10.0 g/L, and the Ni concentration was 1.0 g/L.

The Li quality of lithium carbonate obtained in the Li recovery step was measured and the Li recovery rate was determined from the Li quality. As a result, the Li recovery rate was 14.7%.

As Comparative Example, a test that was the same as that of Example was conducted with the exception that the Li concentration step was not carried out, and the extracted solution after the Ni recovery step was subjected to the Li recovery step. In this case, although Li was recovered, the Li recovery rate was 5% or less.

From the above Example and Comparative Example, it was found that the Li recovery rate could be significantly improved by carrying out the Li concentration step.

What is claimed is:

1. A method for treating lithium ion battery scrap containing Li, Ni, Co, Mn, Al, Cu and Fe, the method comprising carrying out a calcination step, a crushing step and a sieving step in this order, and after the steps, the method comprising:
   a leaching step of leaching the lithium ion battery scrap by adding it to an acidic solution to leave at least a part of Cu as a solid;
   a Fe/Al removal step comprising allowing a leached solution obtained in the leaching step to pass through a Fe removal process for separating and removing Fe under a condition at pH of 3.0 to 4.0 and an oxidation-reduction potential (ORPvsAg/AgCl) of 500 mV or more by addition of an oxidizing agent and an Al removal process for separating and removing a part of Al under a condition at pH of 4.0 to 6.0 and an oxidation-reduction potential (ORPvsAg/AgCl) of −500 mV to 100 mV by neutralization in any order;
   an Al/Mn extraction step of extracting and removing a residue of Al and Mn from a separated solution obtained in the Fe/Al removal step by solvent extraction;
   a Co recovery step of extracting and back-extracting Co from a first extracted solution obtained in the Al/Mn extraction step by solvent extraction and recovering the Co by electrolytic winning;
   a Ni recovery step of extracting and back-extracting, by solvent extraction, a part of Ni from a second extracted solution obtained by the solvent extraction in the Co recovery step and recovering the Ni by electrolytic winning;
   a Li concentration step of extracting and back-extracting, by solvent extraction, a residue of Ni and Li from a third extracted solution obtained by the solvent extraction in the Ni recovery step and repeating the operations of the extracting and the back-extracting to concentrate Li; and
   a Li recovery step of carbonating Li in a Li concentrated solution obtained in the Li concentration step to recover the Li as lithium carbonate.

2. The method according to claim 1, wherein in the solvent extraction in the Ni recovery step, a carboxylic acid-based extracting agent is used for the second extracted solution.

3. The method according to claim 1, further comprising a neutralization step of neutralizing the Li concentrated solution obtained in the Li concentration step and recovering a residue of the Ni, prior to the Li recovery step.

4. The method according to claim 3, wherein in the neutralization step, a pH of the Li concentrated solution is within a range of from 10 to 13.

5. The method according to claim 1, wherein the oxidizing agent used in the Fe removal process in the Fe/Al step contains Mn.

6. The method according to claim 1, wherein in the leaching step, the acidic solution has a pH of from 0 to 2 and an oxidation-reduction potential (ORPvsAg/AgCl) of from −500 mV to 0 mV.

7. The method according to claim 1, wherein in the Al/Mn extraction step, an extracting agent comprising a phosphate ester-based extracting agent and an oxime-based extracting agent is used for the separated solution.

8. The method according to claim 1, wherein in the solvent extraction in the Co recovery step, a phosphonate ester-based extracting agent is used for the first extracted solution.

9. The method according to claim 1, wherein in the solvent extraction in the Li concentration step, an extracting agent comprising 2-ethylhexyl 2-ethylhexylphosphonate or di-2-ethylhexylphosphoric acid is used.

10. The method according to claim 1, wherein in the Li recovery step, the carbonating of Li is carried out by adding a carbonate salt to or blowing a carbon dioxide gas into the Li concentrated solution.

11. The method according to claim 1, wherein in the Li recovery step, the lithium carbonate is subjected to repulp washing and the carbon dioxide gas is blown, and impurities are then removed by solid-liquid separation to purity the lithium carbonate.

12. A method for treating lithium ion battery scrap that contains Li, Co, Al, Cu and Fe and does not contain Ni, the method comprising carrying out a calcination step, a crushing step and a sieving step in this order, and after the steps, the method comprising:
   a leaching step of leaching the lithium ion battery scrap by adding it to an acidic solution to leave at least a part of Cu as a solid;
   a Fe/Al removal step comprising allowing a leached solution obtained in the leaching step to pass through a Fe removal process for separating and removing Fe under a condition at pH of 3.0 to 4.0 and an oxidation-reduction potential (ORPvsAg/AgCl) of 500 mV or more by addition of an oxidizing agent and an Al removal process for separating and removing a part of Al under a condition at pH of 4.0 to 6.0 and an oxidation-reduction potential (ORPvsAg/AgCl) of −500 mV to 100 mV by neutralization in any order;
   an Al/Mn extraction step of extracting a residue of Al and Mn from a separated solution obtained in the Fe/Al removal step by solvent extraction;

a Co recovery step of extracting and back-extracting Co from a first extracted solution obtained in the Al/Mn extraction step by solvent extraction and recovering the Co by electrolytic winning;

a Li concentration step of extracting and back-extracting, by solvent extraction, Li from a second extracted solution obtained by the solvent extraction in the Co recovery step and repeating the operations of the extracting and the back-extracting to concentrate Li; and a Li recovery step of carbonating Li in a Li concentrated solution obtained in the Li concentration step to recover the Li as lithium carbonate.

13. The method according to claim 12, wherein the oxidizing agent used in the Fe removal process in the Fe/Al step contains Mn.

14. The method according to claim 12, wherein in the leaching step, the acidic solution has a pH of from 0 to 2 and an oxidation-reduction potential (ORPvsAg/AgCl) of from −500 mV to 0 mV.

15. The method according to claim 12, wherein in the Al/Mn extraction step, an extracting agent comprising a phosphate ester-based extracting agent and an oxime-based extracting agent is used for the separated solution.

16. The method according to claim 12, wherein in the solvent extraction in the Co recovery step, a phosphonate ester-based extracting agent is used for the first extracted solution.

17. The method according to claim 12, wherein in the solvent extraction in the Li concentration step, an extracting agent comprising 2-ethylhexyl 2-ethylhexylphosphonate or di-2-ethylhexylphosphoric acid is used.

18. The method according to claim 12, wherein in the Li recovery step, the carbonating of Li is carried out by adding a carbonate salt to or blowing a carbon dioxide gas into the Li concentrated solution.

19. The method according to claim 12, wherein in the Li recovery step, the lithium carbonate is subjected to repulp washing and the carbon dioxide gas is blown, and impurities are then removed by solid-liquid separation to purity the lithium carbonate.

20. A method for treating lithium ion battery scrap containing Li, Ni, Co, Mn, Al, Cu and Fe, the method comprising:

a leaching step of leaching the lithium ion battery scrap by adding it to an acidic solution to leave at least a part of Cu as a solid;

a Fe/Al removal step comprising allowing a leached solution obtained in the leaching step to pass through a Fe removal process for separating and removing Fe under a condition at pH of 3.0 to 4.0 and an oxidation-reduction potential (ORPvsAg/AgCl) of 500 mV or more by addition of an oxidizing agent and an Al removal process for separating and removing a part of Al under a condition at pH of 4.0 to 6.0 and an oxidation-reduction potential (ORPvsAg/AgCl) of −500 mV to 100 mV by neutralization in any order;

an Al/Mn extraction step of extracting and removing a residue of Al and Mn from a separated solution obtained in the Fe/Al removal step by solvent extraction;

a Co recovery step of extracting and back-extracting Co from a first extracted solution obtained in the Al/Mn extraction step by solvent extraction and recovering the Co;

a Ni recovery step of extracting and back-extracting, by solvent extraction, a part of Ni from a second extracted solution obtained by the solvent extraction in the Co recovery step and recovering the Ni.

* * * * *